(12) United States Patent
Furuya et al.

(10) Patent No.: US 6,198,586 B1
(45) Date of Patent: Mar. 6, 2001

(54) VOICE RECORDING/PLAYBACK APPARATUS FOR PRODUCING A NOISE LEVEL OF A VOICE OUTPUT UNIT IN A VOICE RECORDING MODE

(75) Inventors: Misao Furuya; Seiji Takamatsu, both of Atsugi (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 09/040,012

(22) Filed: Mar. 17, 1998

(30) Foreign Application Priority Data

Mar. 21, 1997 (JP) .................................................... 9-068142

(51) Int. Cl.[7] .................................................. G11B 15/12

(52) U.S. Cl. ............................................................. 360/61

(58) Field of Search ........................................ 360/61, 62

(56) References Cited

U.S. PATENT DOCUMENTS

| | | | | |
|---|---|---|---|---|
| 3,806,820 | * | 4/1974 | Uchiyama | 325/478 |
| 3,843,838 | * | 10/1974 | Wanek | 178/5.8 R |
| 4,605,975 | * | 8/1986 | Beaman | 360/62 |
| 5,602,687 | * | 2/1997 | Tanaka et al. | 360/61 |

* cited by examiner

Primary Examiner—W. Chris Kim
(74) Attorney, Agent, or Firm—Ladas & Parry

(57) ABSTRACT

A voice recording/playback apparatus includes a head unit which records a voice signal in a recording medium and for playing back a recorded voice signal from the recording medium. A playback head amplifier unit amplifies a playback signal output from the head unit. A voice output unit outputs a voice in accordance with the playback signal amplified by the playback head amplifier unit. A muting switch is provided between the playback head amplifier unit and the voice output unit. The muting switch cuts off a connection between the playback head amplifier unit and the voice output unit when a voice recording mode is performed by the head unit.

7 Claims, 4 Drawing Sheets

VOICE RECORDING/PLAYBACK APPARATUS FOR PRODUCING A NOISE LEVEL OF A VOICE OUTPUT UNIT IN A VOICE RECORDING MODE

BACKGROUND OF THE INVENTION (1) Field of the Invention

The present invention relates to a voice recording/playback apparatus adapted to record a voice signal in a recording medium and play back a recorded voice signal from the recording medium.

(2) Description of the Related Art

A compact-disk (CD) radio cassette tape recorder system in which a CD playback unit, a radio unit and a cassette tape recorder unit are integrally provided is known. In an existing voice recording/playback apparatus of this type, a built-in microphone is provided to record a voice signal in a magnetic tape during a microphone voice recording mode. In order to perform the microphone voice recording mode, a mode selection switch of the CD radio cassette tape recorder system is set by a user.

If a speaker unit outputs a voice during the microphone voice recording mode, the voice is captured by the built-in microphone which causes occurrence of howling. To avoid howling, it is necessary that the outputting of a voice by the speaker unit during the microphone voice recording mode be inhibited.

Generally, in order to inhibit the outputting of a voice by the speaker unit during the microphone voice recording mode, an input of a playback head amplifier unit of the CD radio cassette tape recorder system is set in a muted condition.

FIG. 3 shows a conventional voice recording/playback apparatus of the above-described type.

The conventional voice recording/playback apparatus 1 of FIG. 3 is applied to, for example, an existing CD radio cassette tape recorder system.

As shown in FIG. 3, the conventional voice recording/playback apparatus 1 includes a tape recorder unit 3 which records a voice signal in a magnetic tape 2 and plays back a recorded voice signal from the magnetic tape 2. A CD playback unit 4 provides a voice signal (or a playback signal) derived from a recorded voice signal of a compact disk (CD). A radio unit 5 provides a voice signal (or a demodulated signal) derived from a radio signal transmitted by a radio broadcast station. A built-in microphone unit 6 provides a voice signal derived from an external voice.

In the conventional voice recording/playback apparatus 1, a mode selection switch 7 is provided to select one of a plurality of operational modes of the conventional voice recording/playback apparatus 1. The operational modes include, for example, a tape playback mode, a microphone voice recording mode, a radio output mode, a microphone output mode, and a CD playback mode. A voice output unit 8 amplifies a voice signal obtained during the operational mode selected by the mode selection switch 7, and outputs a voice in accordance with the voice signal. A control panel 9 is provided for a user to perform a switching operation on the control panel 9. A connection of the mode selection switch 7 is switched in response to the switching operation by the user.

The tape recorder unit 3 includes a magnetic head 11, a recording head amplifier unit 12, a playback head amplifier unit 13, a record/playback switch SW1 and a record/playback switch SW2.

The magnetic head 11 is a recording/playback head unit which records a voice signal in the magnetic tape 2 and plays back a recorded voice signal from the magnetic tape 2. The recording head amplifier unit 12 amplifies a voice signal to be input to the magnetic head 11. The playback head amplifier unit 12 amplifies a playback signal output from the magnetic head 11. The record/playback switches SW1 and SW2 are provided to switch a connection of internal paths when one of a playback mode and a recording mode is selected.

In the tape recorder unit 3, the magnetic tape 2 runs in a tape running path, and at the same time, the magnetic head 11 is brought into contact with the magnetic tape 2. The tape recorder unit 3 records a voice signal in the magnetic tape 2 by using the magnetic head 11 during the recording mode. The tape recorder unit 3 outputs a playback signal derived from a recorded voice signal of the magnetic tape 2 by using the magnetic head 11 during the playback mode.

In the tape recorder unit 3, the magnetic head 11 has a first end connected to a movable contact of the record/playback switch SW1, and a second end connected to both the recording head amplifier unit 12 and a fixed contact of the record/playback switch SW2.

The record/playback switch SW1 has a movable contact T1, a fixed contact T2, and a fixed contact T3. A connection of the movable contact T1 of the record/playback switch SW1 is switched to one of the two fixed contacts T2 and T3 by a switching operation by the user on the control panel 9. In the record/playback switch SW1, the movable contact T1 is connected to the first end of the magnetic head 11, the fixed contact T2 is grounded via a constant-current power supply 14, and the fixed contact T3 is connected to a central voltage supply line. A central voltage "½ Vcc" from the central voltage supply line is supplied to the fixed contact T3 of the record/playback switch SW1. During the recording mode, the connection of the movable contact T1 is switched to the fixed contact T2. During the playback mode, the connection of the movable contact T1 is switched to the fixed contact T3.

The record/playback switch SW2 has a movable contact T11, a fixed contact T12, and a fixed contact T13. A connection of the movable contact T11 of the record/playback switch SW2 is switched to one of the two fixed contacts T12 and T13 by a switching operation by the user on the control panel 9. In the record/playback switch SW2, the movable contact T11 is connected to an input of the playback head amplifier unit 13, the fixed contact T12 is connected to the central voltage supply line, and the fixed contact T13 is connected to the second end of the magnetic head 11. The central voltage "½ Vcc" from the central voltage supply line is supplied to the fixed contact T12 of the record/playback switch SW2. During the recording mode, the connection of the movable contact T11 is switched to the fixed contact T12. During the playback mode, the connection of the movable contact T11 is switched to the fixed contact T13.

The recording head amplifier unit 12 includes an operational amplifier 21 and a plurality of resistors R1 through R6. The recording head amplifier unit 12 constitutes a non-inverting amplifier. The recording head amplifier unit 12 amplifies a voice signal output from one of the CD playback unit 4, the radio unit 5 and the microphone unit 6, and supplies the amplified voice signal to the magnetic head 11.

The playback head amplifier unit 13 includes an operational amplifier 31, a plurality of resistors R11 through R13, a capacitor C1, and a capacitor C2. The playback head amplifier unit 13 constitutes a high-gain amplifier. During the playback mode, the magnetic head 11 is connected through the record/playback switch SW2 to a non-inverting input of the operational amplifier 31 in the playback head amplifier unit 13. A playback signal from the magnetic head 11 is amplified by the operational amplifier 31, and the amplified playback signal is output to the mode selection switch 7. During the recording mode, the central voltage "½ Vcc" from the central voltage supply line is supplied through the record/playback switch SW2 to the non-inverting input of the operational amplifier 31. The input of the playback head amplifier unit 13 is set in the muted condition.

It is necessary for the playback head amplifier unit 13 to amplify a small playback signal from the magnetic head 11. The playback head amplifier unit 13 provides a high gain, for example, 55 dB at 50 Hz, 39 dB at 1 kHz, 34 dB at 10 kHz.

The mode selection switch 7 includes a movable contact T21 and a plurality of fixed contacts T22 through T25. In the mode selection switch 7, a connection of the movable contact T21 is switched to one of the fixed contacts T22–T25 in response to a switching operation by the user on the control panel 9.

The fixed contact T22 of the mode selection switch 7 is connected to an output of the playback head amplifier unit 13.

The fixed contact T23 is connected to an output of tire radio unit 5 via a buffer 51. The buffer 51 amplifies the demodulated signal provided by the radio unit 5 and supplies the amplified signal to the fixed contact T23 of the mode selection switch 7. An intermediate point between the buffer 51 and the fixed contact T23 is connected to an input of the recording head amplifier unit 12. This allows the recording head amplifier unit 12 to record the voice signal from the radio unit 5 in the magnetic tape 2.

The fixed contact T24 is connected to an output of the microphone unit 6 via a buffer 52. The buffer 52 amplifies the voice signal provided by the microphone unit 6 and supplies the amplified signal to the fixed contact T24 of the mode selection switch 7. An intermediate point between the buffer 52 and the fixed contact T24 is connected to the input of the recording head amplifier unit 12.

The fixed contact T25 is connected to an output of the CD playback unit 4 via a buffer 53. The buffer 53 amplifies the voice signal provided by the CD playback unit 4 and supplies the amplified signal to the fixed contact T25 of the mode selection switch 7. An intermediate point between the buffer 53 and the fixed contact T25 is connected to the input of the recording head amplifier unit 12. This allows the recording head amplifier unit 12 to record the voice signal from the CD playback unit 4 in the magnetic tape 2.

In the conventional voice recording/playback apparatus 1, when the control panel 9 is operated by the user to select either the tape playback mode or the microphone voice recording mode, the connection of the movable contact T21 in the mode selection switch 7 is switched to the fixed contact T22. When the control panel 9 is operated by the user to select the radio output mode, the connection of the movable contact T21 in the mode selection switch 7 is switched to the fixed contact T23.

Further, in the conventional voice recording/playback apparatus 1, when the control panel 9 is operated by the user to select the microphone voice output mode, the connection of the movable contact T21 in the mode selection switch 7 is switched to the fixed contact T24. When the control panel 9 is operated by the user to select the CD playback mode, the connection of the movable contact T21 in the mode selection switch 7 is switched to the fixed contact T25.

The voice output unit 8 includes a volume-control variable resistor Rr, an amplifier unit 41, a capacitor C11, and a speaker unit 42. The voice output unit 8 amplifies a voice signal from the selected input of the mode selection switch 7, and the speaker unit 42 outputs a voice in accordance with the voice signal. The volume-control variable resistor Rr includes a slide contact T31 and a resistor R0, and the slide contact T31 is slidable on the resistor R0 at a desired position. By using the volume-control variable resistor Rr, the intensity level of the voice of the voice output unit 8 can be adjusted. The resistor R0 has a first end connected to the movable contact T21 of the mode selection switch 7 and a second end connected to the central voltage supply line. The central voltage "½ Vcc" from the central voltage supply line is supplied to the second end of the resistor R0. The slide contact T31 of the variable resistor Rr is connected to an input of the amplifier unit 41. An output of the amplifier unit 41 is connected through the capacitor C11 to the speaker unit 42.

In the voice output unit 8, the amplifier unit 41 includes an operational amplifier 43, a resistor R21 and a resistor R22. The amplifier unit 41 constitutes a power amplifier. The slide contact T31 of the volume-control variable resistor Rr is connected to a non-inverting input of the operational amplifier 43. The amplifier unit 41 amplifies a voice signal provided by the volume-control variable resistor Rr, and supplies the amplified signal to the speaker unit 42.

Next, FIG. 4 shows an operation of the conventional voice recording/playback apparatus of FIG. 3.

In FIG. 4, "(A)" indicates a switching operation by the user on the control panel 9, "(B)" indicates a connection of the movable contact T21 in the mode selection switch 7, "(C)" indicates a connection of the movable contact T1 in the record/playback switch SW1, "(D)" indicates a connection of the movable contact T11 in the record/playback switch SW2, "(E)" indicates a waveform of a playback signal supplied to the input of the voice output unit 8.

An operation of the conventional voice recording/ playback apparatus 1 when the tape playback mode is selected will now be described. As indicated by (A) in FIG. 4, the control panel 9 is operated at a time "t1" by the user to select the tape playback mode. During the tape playback mode, a recorded voice signal is reproduced from the magnetic tape 2 by the tape recorder unit 3.

As indicated by (B) in FIG. 4, the connection of the movable contact T21 in the mode selection switch 7 is switched to the fixed contact T22 in response to the switching operation by the user.

As indicated by (C) in FIG. 4, the connection of the movable contact T1 in the record/playback switch SW1 is switched to the fixed contact T3 in response to the switching operation by the user.

As indicated by (D) in FIG. 4, the connection of the movable contact T11 in the record/playback switch SW2 is switched to the fixed contact T13 in response to the switching operation by the user.

As indicated by (E) in FIG. 4, the connection of the movable contact T21 in the muting switch SW11 is switched to the fixed contact T33 in response to the switching operation by the user.

Therefore, in the conventional voice recording/playback apparatus 1, during the tape playback mode, a voice signal is reproduced from the magnetic tape 2 by the magnetic head 11, and the voice signal from the magnetic head 11 is supplied through the SW2 to the playback head amplifier unit 13. A playback signal amplified by the playback head amplifier unit 13 is supplied through the mode selection switch 7 to the input of the voice output unit 8. The speaker unit 42 of the voice output unit 8 outputs a voice in accordance with the playback signal amplified by the playback head amplifier unit 13. A waveform of the playback signal supplied to the input of the voice output unit 8 in the present case is indicated by (E) in FIG. 4.

Next, an operation of the conventional voice recording/ playback apparatus 1 when the microphone voice recording mode is selected will now be described with reference to FIG. 4.

As indicated by (A) in FIG. 4, the control panel 9 is operated at a time "t2" by the user to select the microphone voice recording mode. During the microphone voice recording mode, a voice signal provided by the microphone unit 6 is recorded in the magnetic tape 2 by the tape recorder unit 3.

As indicated by (B) in FIG. 4, the connection of the movable contact T21 in the mode selection switch 7 is switched to the fixed contact T22 in response to the switching operation by the user.

As indicated by (C) in FIG. 4, the connection of the movable contact T1 in the record/playback switch SW1 is switched to the fixed contact T2 in response to the switching operation by the user.

As indicated by (D) in FIG. 4, the connection of the movable contact T11 in the record/playback switch SW2 is switched to the fixed contact T12 in response to the switching operation by the user. The central voltage "½ Vcc" from the central voltage supply line is supplied from the fixed contact T12 to the input of the playback head amplifier unit 13, instead of the playback signal from the magnetic head 11. The input of the playback head amplifier unit 13 is held at the central voltage "½ Vcc" and set in the muted condition. The playback head amplifier unit 13 hardly supplies a playback signal to the voice output unit 8.

Therefore, in the conventional voice recording/playback apparatus 1, during the microphone voice recording mode, the connection between the input of the playback head amplifier unit 13 and the magnetic head 11 is cut off by the record/playback switch SW2, and the input of the playback head amplifier unit 13 is set in the muted condition.

However, the connection between the playback head amplifier unit 13 and the voice output unit 8 is maintained by the mode selection switch 7 during the microphone voice recording mode. A playback signal output from the playback head amplifier unit 13 is not completely muted by the record/playback switch SW2. If a noise is delivered from the central voltage supply line to the input of the playback head amplifier unit 13, an amplified signal of the noise from the playback head amplifier unit 13 is supplied to the input of the voice output unit 8. In the case of the conventional voice recording/playback apparatus 1 of FIG. 3, the amplified signal of the noise is supplied to the input of the voice output unit 8, as indicated by (F) in FIG. 4. The speaker unit 42 may output a noisy sound in accordance with the amplified signal of the noise during the microphone voice recording mode.

SUMMARY OF THE INVENTION

An object of the present invention is to provide an improved voice recording/playback apparatus in which the above-described problems are eliminated.

Another object of the present invention is to provide a voice recording/playback apparatus which effectively reduces a noise level of a voice output unit during a voice recording mode in which a voice signal is recorded by the voice recording/playback apparatus.

The above-mentioned objects of the present invention are achieved by a voice recording/playback apparatus adapted to record a voice signal during a voice recording mode, the voice recording/playback apparatus comprising: a head unit which records a voice signal in a recording medium and plays back a recorded voice signal from the recording medium; a playback head amplifier unit which amplifies a playback signal output from the head unit; a voice output unit which outputs a voice in accordance with the playback signal amplified by the playback head amplifier unit; and a muting switch which is provided between the playback head amplifier unit and the voice output unit and cuts off a connection between the playback head amplifier unit and the voice output unit when the voice recording mode is performed by the head unit.

In the voice recording/playback apparatus of the present invention, the muting switch is provided between the playback head amplifier unit and the voice output unit. The muting switch cuts off the connection between the playback head amplifier unit and the voice output unit when a voice signal provided by a microphone unit is recorded in the recording medium by the voice recording/playback apparatus. Even if a noise is delivered to an input of the playback head amplifier unit, the supplying of an amplified signal of the noise from the playback head amplifier unit to an input of the voice output unit is avoided by the muting switch. Therefore, the voice recording/playback apparatus of the present invention is remarkably effective in reducing the noise level of the voice output unit when a voice signal provided by the microphone unit is recorded in the recording medium.

BRIEF DESCRIPTION OF THE DRAWINGS

The above and other objects, features and advantages of the present invention will become more apparent from the following detailed description when read in conjunction with the accompanying drawings in which.

DETAILED DESCRIPTION OF THE PREFERRED EMBODIMENT

A description will now be given of the preferred embodiment of the present invention with reference to the accompanying drawings.

Figure 1:
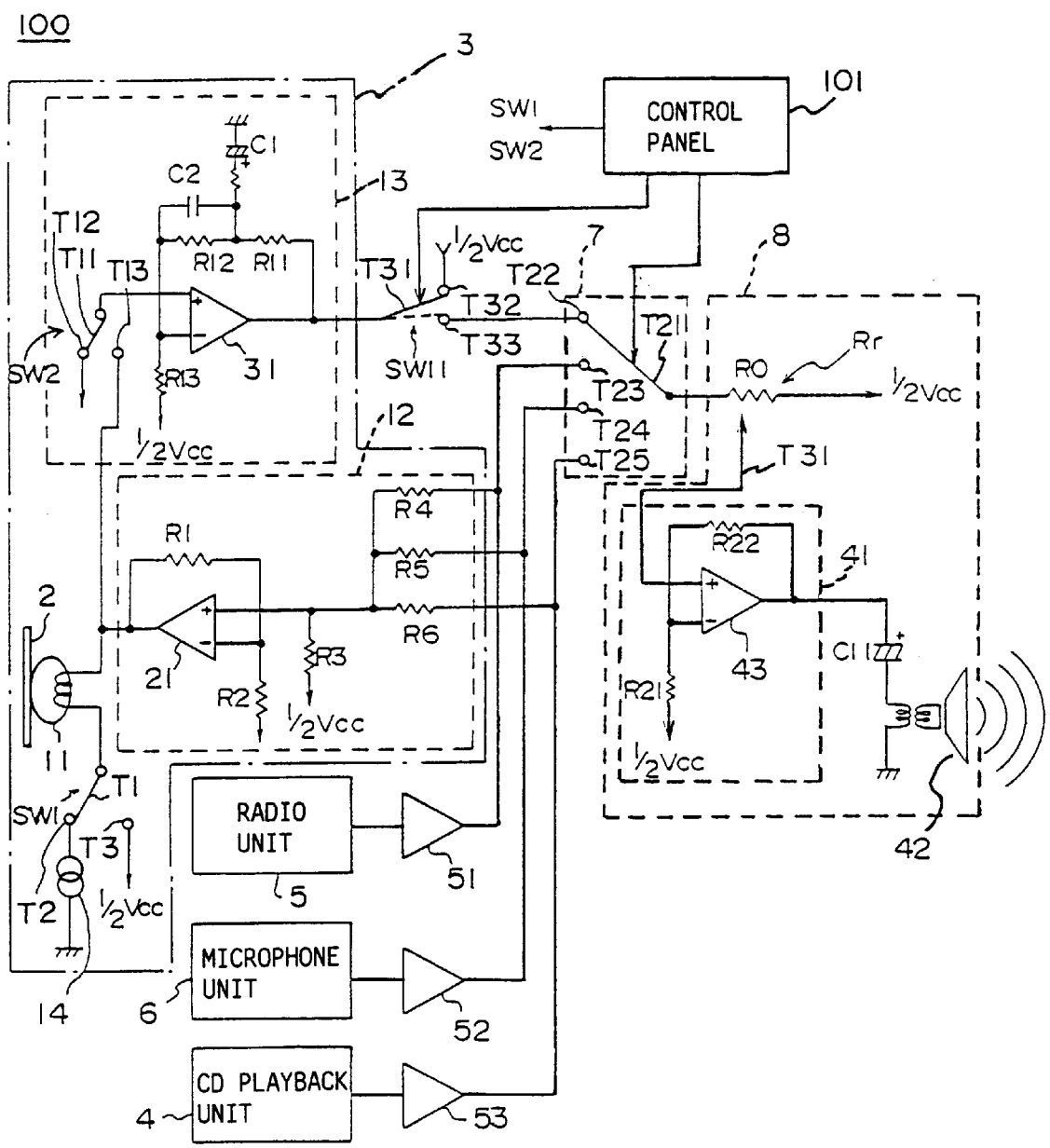
FIG. 1 is a block diagram of one embodiment of the voice recording/playback apparatus of the present invention.
Figure 3:
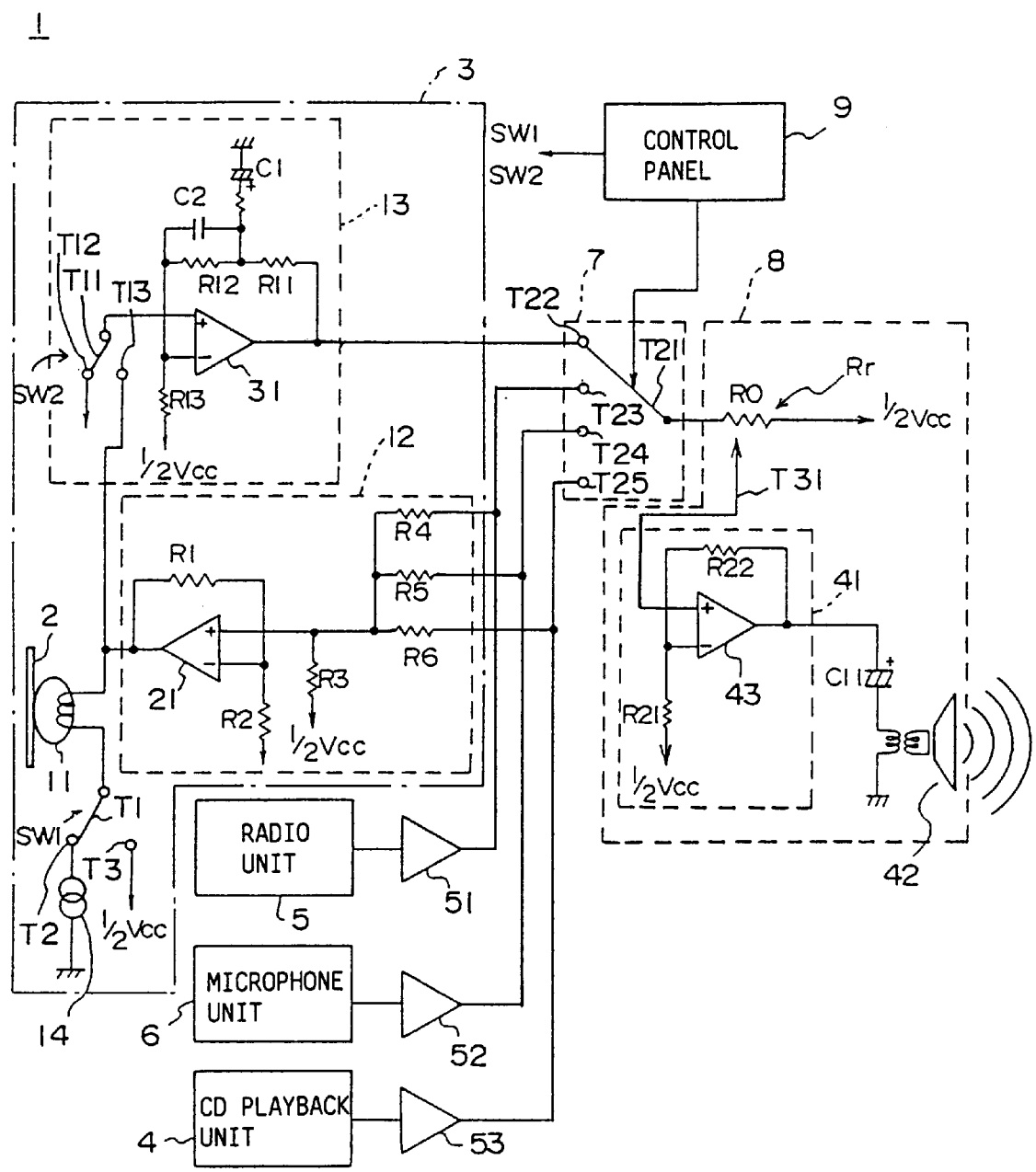
FIG. 3 is a block diagram of a conventional voice recording/playback apparatus.
Figure 4:
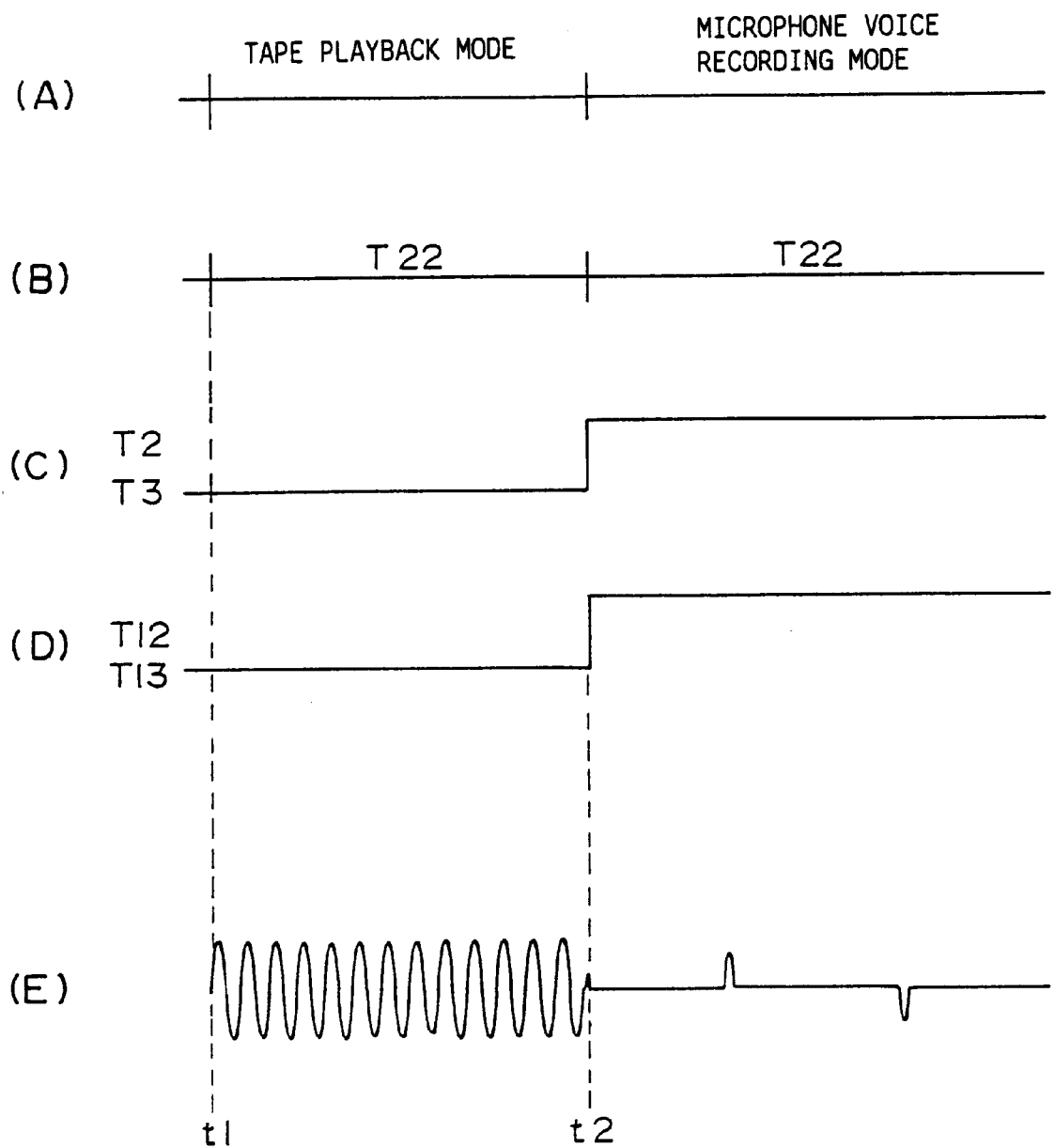
FIG. 4 is a time chart for explaining an operation of the conventional voice recording/playback apparatus of FIG. 3.

FIG. 1 shows one embodiment of a voice recording/ playback apparatus of the present invention. In FIG. 1, the elements which are the same as corresponding elements in FIG. 3 are designated by the same reference numerals, and a description. thereof will be omitted.

As shown in FIG. 1, the voice recording/playback apparatus 100 of the present invention comprises a muting switch SW11 which is provided between the playback head amplifier unit 13 and the voice output unit 8. Specifically, in the present embodiment, the muting switch SW11 is provided between the playback head amplifier unit 13 and the mode selection switch 7.

The muting switch SW11 is, for example, a mechanically operated switch or an electrically operated switch. A connection of the muting switch SW11 is switched by a switching operation by a user on a control panel 101. The switching of the muting switch SW11 is performed, in response to the switching operation of the control panel 101, in synchronism with the switching of the mode selection switch 7, the switching of the record/playback switch SW1, and the switching of the record/playback switch SW2.

In the voice recording/playback apparatus 100, the muting switch SW11 includes a movable contact T31, a fixed contact T32 and a fixed contact T33. The movable contact T31 of the muting switch SW11 is connected to the output of the playback head amplifier unit 13, the fixed contact T32 is connected to a central voltage supply line, and the fixed contact T33 is connected to the fixed contact T22 of the mode selection switch 7. In the muting switch SW11, the connection of the movable contact T31 is switched to one of the fixed contacts T32 and T33 in response to a switching operation by the user on the control panel 101.

Similar to the conventional apparatus 1 of FIG. 3, in the voice recording/playback apparatus 100, the mode selection switch 7 includes the movable contact T21 and the fixed contacts T22–T25. In the mode selection switch 7, the connection of the movable contact T21 is switched to one of the fixed contacts T22–T25 in response to a switching operation by the user on the control panel 101.

In the voice recording/playback apparatus 100, the fixed contact T22 of the mode selection switch 7 is connected through the muting switch SW11 to the output of the playback head amplifier unit 13. The fixed contact T23 is connected to the output of the radio unit 5 via the buffer 51. The intermediate point between the buffer 51 and the fixed contact T23 is connected to the input of the recording head amplifier unit 12. The fixed contact T24 is connected to the output of the microphone unit 6 via the buffer 52. The intermediate point between the buffer 52 and the fixed contact T24 is connected to the input of the recording head amplifier unit 12. The fixed contact T25 is connected to the output of the CD playback unit 4 via the buffer 53. The intermediate point between the buffer 53 and the fixed contact T25 is connected to the input of the recording head amplifier unit 12.

In the present embodiment, when the control panel 101 is operated by the user to select the microphone voice recording mode, the connection of the movable contact T21 in the mode selection switch 7 is switched to the fixed contact T22, and the connection of the movable contact T31 in the muting switch SW11 is switched to the fixed contact T32. A playback signal from the playback head amplifier unit 13 is muted by the muting switch SW11, and the connection between the playback head amplifier unit 13 and the voice output unit 8 is cut off by the muting switch SW11.

In the present embodiment, during the microphone voice recording mode, the switched connection of the record/playback switches SW1 and SW2, the switched connection of the mode selection switch 7, and the switched connection of the muting switch SW11 are shown in FIG. 1.

Further, in the present embodiment, when the control panel 101 is operated by the user to select the tape playback mode, the connection of the movable contact T21 in the mode selection switch 7 is switched to the fixed contact T22, and the connection of the movable contact T31 in the muting switch SW11 is switched to the fixed contact T33. The playback signal output from the playback head amplifier unit 13 is supplied through the muting switch SW11 to the input of the voice output unit 8, and the speaker unit 42 of the voice output unit 8 outputs a voice in accordance with the playback signal amplified by the playback head amplifier unit 13.

Figure 2:
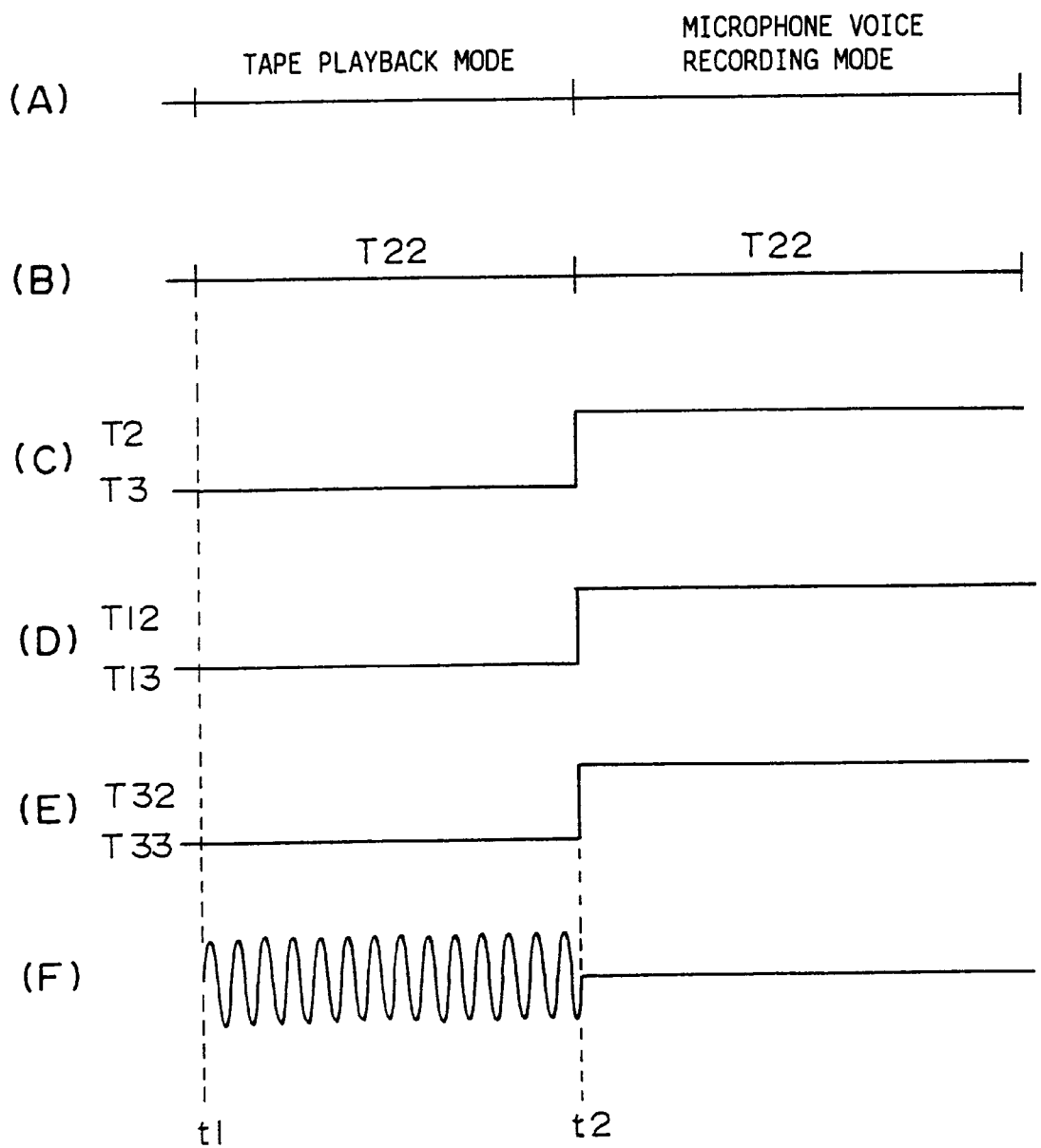
FIG. 2 is a time chart for explaining an operation of the voice recording/playback apparatus of FIG. 1.

FIG. 2 shows an operation of the voice recording/playback apparatus of FIG. 1.

In FIG. 2, "(A)" indicates a switching operation by the user on the control panel 101, "(B)" indicates a connection of the movable contact T21 in the mode selection switch 7, "(C)" indicates a connection of the movable contact T1 in the record/playback switch SW1, "(D)" indicates a connection of the movable contact T11 in the record/playback switch SW2, "(E)" indicates a connection of the movable contact T31 in the muting switch SW11, and "(F)" indicates a waveform of a playback signal supplied to the input of the voice output unit 8.

A description will now be given of an operation of the voice recording/playback apparatus 100 when the tape playback mode is selected, with reference to FIG. 2.

As indicated by (A) in FIG. 2, the control panel 101 is operated at a time "t1" by the user to select the tape playback mode. During the tape playback mode, a recorded voice signal is reproduced from the magnetic tape 2 by the tape recorder unit 3.

As indicated by (B) in FIG. 2, the connection of the movable contact T21 in the mode selection switch 7 is switched to the fixed contact T22 in response to the switching operation by the user on the control panel 101.

As indicated by (C) in FIG. 2, the connection of the movable contact T1 in the record/playback switch SW1 is switched to the fixed contact T3 in response to the switching operation by the user on the control panel 101.

As indicated by (D) in FIG. 2, the connection of the movable contact T11 in the record/playback switch SW2 is switched to the fixed contact T13 in response to the switching operation by the user on the control panel 101.

As indicated by (E) in FIG. 2, the connection of the movable contact T21 in the muting switch SW11 is switched to the fixed contact T33 in response to the switching operation by the user on the control panel 101.

Accordingly, in the voice recording/playback apparatus 100 during the tape playback mode, a voice signal is reproduced from the magnetic tape 2 by the magnetic head 11, and the voice signal from the magnetic head 11 is supplied through the SW2 to the playback head amplifier unit 13. The playback signal output from the playback head amplifier unit 13 is supplied through the muting switch SW11 to the input of the voice output unit 8, and the speaker unit 42 of the voice output unit 8 outputs a voice in accordance with the playback signal amplified by the playback head amplifier unit 13. A waveform of the playback signal supplied to the input of the voice output unit 8 in the present case is indicated by (F) in FIG. 2.

A description will now be given of an operation of the voice recording/playback apparatus 100 when the microphone voice recording mode is selected, with reference to FIG. 2.

As indicated by (A) in FIG. 2, the control panel 101 is operated at a time "t2" by the user to select the microphone voice recording mode. During the microphone voice recording mode, a voice signal provided by the microphone unit 6 is recorded to the magnetic tape 2 by the tape recorder unit 3.

As indicated by (B) in FIG. 2, the connection of the movable contact T21 in the mode selection switch 7 is switched to the fixed contact T22 in response to the switching operation by the user on the control panel 101.

As indicated by (C) in FIG. 2, the connection of the movable contact T1 in the record/playback switch SW1 is switched to the fixed contact T2 in response to the switching operation by the user on the control panel 101.

As indicated by (D) in FIG. 2, the connection of the movable contact T11 in the record/playback switch SW2 is switched to the fixed contact T12 in response to the switching operation by the user on the control panel 101.

As indicated by (E) in FIG. 2, the connection of the movable contact T21 in the muting switch SW11 is switched to the fixed contact T32 in response to the switching operation by the user on the control panel 101. The central voltage "½ Vcc" from the central voltage supply line is supplied from the fixed contact T32 to the output of the playback head amplifier unit 13. The output of the playback head amplifier unit 13 is held at the central voltage "½ Vcc" for the playback signal.

Accordingly, in the voice recording/playback apparatus 100 during the microphone voice recording mode, the fixed contact T22 of the mode selection switch 7 becomes open, and the connection between the playback head amplifier unit 13 and the voice output unit 8 is cut off by the muting switch SW11. The playback signal output from the playback head amplifier unit 13 is muted by the muting switch SW11, and in the present case, no playback signal is supplied to the input of the voice output unit 8, as indicated by (F) in FIG. 2. The speaker unit 42 is placed in the muted condition during the microphone voice recording mode. As described above, the central voltage "½ Vcc" from the central voltage supply line is supplied from the fixed contact T32 to the output of the playback head amplifier unit 13. The output of the playback head amplifier unit 13 is held at the central voltage "½ Vcc" for the playback signal.

In the above-described embodiment, the muting switch SW11 is provided between the playback head amplifier unit 13 and the voice output unit 8. The muting switch SW1L cuts off the connection between the playback head amplifier unit 13 and the voice output unit 8 when a voice signal provided by the microphone unit 6 is recorded to the magnetic tape 2 by the tape recorder unit 3. If a noise is delivered to the input of the playback head amplifier unit 13 with the central voltage ½ Vcc, the amplified signal of the noise from the playback head amplifier unit 13 is not supplied to the input of the voice output unit 8. Therefore, because of the use of the muting switch SW11, the voice recording/playback apparatus 100 of the present embodiment is remarkably effective in reducing the noise level of the power amplifier 41.

In the above-described embodiment, the tape recorder unit 3 which is adapted to record a voice signal in the magnetic tape 2 and play back a recorded voice signal from the magnetic tape 2 is provided. However, the present invention is not limited to the above-described embodiment. The present invention is applicable to another voice recording/playback apparatus adapted to record a voice signal in a recording medium and play back a recorded voice signal from the recording medium.

Further, the present invention is not limited to the above-described embodiment, and variations and modifications may be made without departing from the scope of the present invention.

What is claimed is:

1. A voice recording/playback apparatus adapted to record a voice signal on a recording medium during a voice recording mode, the apparatus comprising:
    a head unit recording a voice signal on said recording medium and playing back a recorded voice signal from said recording medium;
    a playback head amplifier unit amplifying a playback signal output from the head unit;
    a voice ouput unit outputting a voice in accordance with the playback signal amplified by the playback head amplifier unit; and
    a muting switch provided between the playback head amplifier unit and the voice output unit, the muting switch cutting off a connection between the playback head amplifier unit and the voice output unit when the voice recording mode is performed by the head unit, the said muting switch comprising:
        a movable contact connected to an output of the playback head amplifier unit;
        a first fixed contact connected to a voltage supply line; and
        a second fixed contact connected through a mode selection switch to the voice output unit.

2. The voice recording/playback apparatus according to claim 1, further comprising a mode selection switch provided between the playback head amplifier unit and the voice output unit for selecting one of a plurality of operational modes including the voice recording mode.

3. The voice recording/playback apparatus according to claim 2, wherein a connection of the muting switch is switched in synchronism with a switching of the mode selection switch when the voice recording mode is selected, so that the muting switch cuts off the connection between the playback head amplifier unit and the voice output unit.

4. The voice recording/playback apparatus according to claim 1, wherein the voice recording/playback apparatus supplies a central voltage from a central voltage supply line to an output of the playback head amplifier unit when a connection of the muting switch is switched to cut off the connection between the playback head amplifier unit and the voice output unit.

5. The voice recording/playback apparatus according to claim 1, further comprising a control panel on which a switching operation is performed by a user, wherein a connection of the muting switch is switched in response to the switching operation by the user.

6. The voice recording/playback apparatus according to claim 5, further comprising a mode selection switch provided between the playback head amplifier unit and the voice output unit for selecting one of a plurality of operational modes including the voice recording mode, wherein a connection of the muting switch is switched in synchronism with a switching of the mode selection switch when a switching operation is performed on the control panel to select the voice recording mode, so that the muting switch cuts off the connection between the playback head amplifier unit and the voice output unit.

7. The voice recording/playback apparatus according to claim 1, wherein a connection of the movable contact of the muting switch is switched to one of the first fixed contact and the second fixed contact, the connection of the movable contact being switched to the first fixed contact when the voice recording mode is performed, and the connection of the movable contact being switched to the second fixed contact when another operational mode is performed.

* * * * *

UNITED STATES PATENT AND TRADEMARK OFFICE
CERTIFICATE OF CORRECTION

PATENT NO. : 6,198,586 B1
DATED : March 6, 2001
INVENTOR(S) : Misao Furuya et al It is certified that error appears in the above-identified patent and that said Letters Patent is hereby corrected as shown below:

<u>Title page,</u>
Item [54], change "PRODUCING" to -- REDUCING --

<u>Column 1,</u>
Line 2, change "PRODUCING" to -- REDUCING --

Signed and Sealed this

Twenty-fifth Day of September, 2001

Attest:

*Nicholas P. Godici*

NICHOLAS P. GODICI
*Attesting Officer*   *Acting Director of the United States Patent and Trademark Office*